UNITED STATES PATENT OFFICE.

WILLIAM HERMS, OF SAN FRANCISCO, CALIFORNIA.

GLAZE FOR THE INTERIOR OF VATS AND THE LIKE.

No. 880,141.  Specification of Letters Patent.  Patented Feb. 25, 1908.

Application filed May 19, 1906. Serial No. 317,818.

*To all whom it may concern:*

Be it known that I, WILLIAM HERMS, a citizen of the United States, residing at the city and county of San Francisco and State of California, have invented new and useful Improvements in Glaze for the Interior of Vats and the Like, of which the following is a specification.

My invention relates to a glazing and protective liquid for use by brewers and others in coating the interior of barrels, and other receptacles which are to be rendered watertight or non-absorbent, and the contents of which are to be protected against contamination by the wood or other material forming the barrel or receptacle.

It has always been a matter of difficulty to find a suitable coating for the inside of beer barrels, vats and kegs, which will for any length of time effectually prevent the beer from soaking into the wood, or guard against a disagreeable taste of wood, or something else being imparted to the beer. Varnishes of different sorts have been tried extensively, but without success, as they soon bleach out or discolor and spoil the liquor.

The object of my invention is to provide a water-proof, tasteless and durable glaze which can be easily applied in liquid form to anything requiring a glaze or coating of this character.

In carrying out my invention I employ as a vehicle seed-lac (the gum of the Ficus tree of India), paraffin or other appropriate waxy binder, and a suitable solvent as alcohol.

In practice I have successfully used the following formula:

| | |
|---|---|
| The ordinary seed-lac of commerce | 15 lbs. |
| Paraffin, as a binder, (approximately) | 3 lbs. |
| Alcohol, or other suitable solvent (approximately) | 5 gals. |

The seed-lac is crushed or ground, and then heated in any suitable vessel to melting point, or approximately to 150° F.

The paraffin binder after heating to about 200° F. more or less, is added to the molten seed-lac, and the temperature raised to about 225° or 250° F. more or less, and the two stirred until thoroughly mixed. This mixture is then allowed to cool to about 70° F. more or less, when a suitable quantity of alcohol is added as a solvent to produce the desired degree of liquidity. When thoroughly cold the stuff is ready for use, and is applied by dipping, by flowing, by brush or any other suitable means. Usually I add about five gallons of alcohol to the above proportions of mixed gum and paraffin, and dilute it further if desired before using.

By varying the degree of viscosity of the liquid, any desired thickness of the glaze can be obtained.

My product does not chip or crack. Where used as a brewers' glaze, it does not produce an after taste in or discoloration of the beer or other liquid, such as so many varnishes do; it endures for a long period of time without change or deterioration.

While I have particularly mentioned this glaze as used by brewers, it is manifest that it is applicable in a great variety of arts, such as in the packing of fruits or other materials; in fact wherever there is need of protecting the receptacle or container from the contents or the contents from the receptacle.

Having thus described my invention, what I claim and desire to secure by Letters Patent is—

1. A new composition of matter comprising a mixture of seed-lac, paraffin, and a suitable solvent, the amount of seed-lac employed being in excess of that of the paraffin.

2. A new composition of matter comprising a mixture of approximately 80 parts of seed-lac, approximately 20 parts of paraffin, and a suitable quantity of alcohol.

In testimony whereof I have hereunto set my hand in the presence of two subscribing witnesses.

WILLIAM HERMS.

Witnesses:
S. H. NOURSE,
D. B. RICHARDS.